US009853536B2

(12) United States Patent
Xu et al.

(10) Patent No.: US 9,853,536 B2
(45) Date of Patent: Dec. 26, 2017

(54) METHODS, SYSTEMS, AND COMPUTER READABLE MEDIA FOR MANAGING THE DISTRIBUTION OF POWER FROM A PHOTOVOLTAIC SOURCE IN A MULTIPLE-FLOOR BUILDING

(71) Applicant: ABB Schweiz AG, Baden (CH)

(72) Inventors: Jing Xu, Cary, NC (US); Zhenyuan Wang, Morrisville, NC (US); Jun Li, Cary, NC (US); Waqas Arshad, Raleigh, NC (US)

(73) Assignee: ABB Schweiz AG (CH)

( * ) Notice: Subject to any disclaimer, the term of this patent is extended or adjusted under 35 U.S.C. 154(b) by 687 days.

(21) Appl. No.: 14/139,728

(22) Filed: Dec. 23, 2013

(65) Prior Publication Data
US 2015/0180230 A1     Jun. 25, 2015

(51) Int. Cl.
*H02J 3/14*     (2006.01)
*H02J 1/00*     (2006.01)
(Continued)

(52) U.S. Cl.
CPC ............ *H02M 1/10* (2013.01); *H02J 1/08* (2013.01); *H02J 4/00* (2013.01); *H02J 7/35* (2013.01);
(Continued)

(58) Field of Classification Search
CPC ........ H02J 4/00; H02J 1/00; H02J 3/14; H02J 9/06; H02J 3/381; H02J 1/08; H02M 1/10; G01R 31/02; G01R 31/021
(Continued)

(56) References Cited

U.S. PATENT DOCUMENTS 2,920,241 A    1/1960   Jacobs, Jr. et al.
6,295,215 B1    9/2001   Faria et al.
(Continued)

FOREIGN PATENT DOCUMENTS

CN    103 178 553 A    6/2013
EP    0 932 237 A2    7/1999
(Continued)

OTHER PUBLICATIONS

Notification of Transmittal of the International Search Report and the Written Opinion of the International Searching Authority, or the Declaration for International Application No. PCT/US2014/056692 (dated Apr. 8, 2015).
(Continued)

*Primary Examiner* — Rexford Barnie
*Assistant Examiner* — Jagdeep Dhillon
(74) *Attorney, Agent, or Firm* — Taft Stettinius & Hollister LLP

(57) ABSTRACT

Methods, systems, and computer readable media for managing the distribution of photovoltaic power in a multi-floor building are disclosed. According to one aspect, a method includes determining power requirements for each of a plurality of loads associated with a respective plurality of floors in a multi-floor building, wherein each of the plurality of floors includes a direct current (DC) distribution bus. The method further includes using a PV converter to supply a power output from a PV source to one or more of the plurality of loads via one or more respective DC distribution buses, wherein the power output is supplied to the one or more of the plurality of loads in an order such that each subsequent load is supplied at least a remaining portion of the power output after the power requirements of a previously supplied load is fully satisfied.

15 Claims, 5 Drawing Sheets

(51) Int. Cl.
*H02M 1/10* (2006.01)
*H02J 4/00* (2006.01)
*H02J 1/08* (2006.01)
*H02J 7/35* (2006.01)
*H02J 3/38* (2006.01)

(52) U.S. Cl.
CPC ......... *H02J 3/383* (2013.01); *H02J 2001/002* (2013.01); *Y02B 10/14* (2013.01); *Y02E 10/563* (2013.01); *Y02E 10/566* (2013.01); *Y10T 307/414* (2015.04)

(58) Field of Classification Search
USPC .............. 307/32, 26, 66, 64, 43, 80, 28, 25; 361/86, 93.1
See application file for complete search history.

(56) References Cited

U.S. PATENT DOCUMENTS

| | | | |
|---|---|---|---|
| 6,492,747 | B1 | 12/2002 | Hoffmann |
| 7,893,559 | B2 | 2/2011 | Petersen et al. |
| 7,932,621 | B1 | 4/2011 | Spellman |
| 8,049,366 | B2 | 11/2011 | Shyu et al. |
| 8,106,533 | B1 | 1/2012 | Johnson |
| 9,300,171 | B2 | 3/2016 | Moth |
| 2004/0027734 | A1 | 2/2004 | Fairfax et al. |
| 2006/0043797 | A1 | 3/2006 | Hjort et al. |
| 2007/0029879 | A1 | 2/2007 | Eldredge |
| 2009/0251072 | A1 | 10/2009 | Barnett et al. |
| 2010/0292853 | A1 | 11/2010 | McDonnell |
| 2011/0006607 | A1 | 1/2011 | Kwon et al. |
| 2011/0148213 | A1 | 6/2011 | Baldwin et al. |
| 2011/0187197 | A1* | 8/2011 | Moth ................ H02J 9/062 307/66 |
| 2011/0217615 | A1 | 9/2011 | Smith et al. |
| 2012/0071082 | A1* | 3/2012 | Karamanos ........... F24F 5/0003 454/284 |
| 2012/0181865 | A1* | 7/2012 | Muthu ................ H02J 1/08 307/26 |
| 2012/0185107 | A1 | 7/2012 | Takehara et al. |
| 2013/0099567 | A1 | 4/2013 | Pfitzer |
| 2013/0200714 | A1 | 8/2013 | Pan et al. |
| 2014/0060100 | A1 | 3/2014 | Bryson |
| 2014/0293669 | A1* | 10/2014 | Fornage ................ H02J 3/385 363/95 |
| 2015/0021988 | A1 | 1/2015 | Barnetson et al. |
| 2015/0092311 | A1* | 4/2015 | Wang ................ H02H 1/043 361/86 |
| 2015/0137595 | A1 | 5/2015 | Xu et al. |
| 2015/0207316 | A1* | 7/2015 | Saussele ................ H02S 10/20 700/287 |
| 2015/0253360 | A1* | 9/2015 | Wendt ................ H05B 37/0245 307/18 |

FOREIGN PATENT DOCUMENTS

| | | |
|---|---|---|
| EP | 0 932 237 B1 | 8/2006 |
| GB | 2 275 378 A | 8/1994 |
| GB | 2 450 534 A | 12/2008 |
| JP | H02 164236 A | 6/1990 |
| WO | WO 2009/124227 A1 | 10/2009 |
| WO | WO 2011/033352 A1 | 3/2011 |
| WO | WO 2015/076920 A1 | 5/2015 |

OTHER PUBLICATIONS

Restriction/Election Requirement for U.S. Appl. No. 14/042,594 (May 26, 2015).
Non-Final Office Action for U.S. Appl. No. 14/085,764 (dated Nov. 18, 2016).
Applicant Initated Interview Summary for U.S. Appl. No. 14/085,764 (Sep. 8, 2016).
Non-Final Office Action for U.S. Appl. No. 14/085,764 (dated Apr. 22, 2016).
Notice of Allowance and Fee(s) Due for U.S. Appl. No. 14/042,594 (dated Aug. 14, 2015).

* cited by examiner

METHODS, SYSTEMS, AND COMPUTER READABLE MEDIA FOR MANAGING THE DISTRIBUTION OF POWER FROM A PHOTOVOLTAIC SOURCE IN A MULTIPLE-FLOOR BUILDING

TECHNICAL FIELD

The subject matter described herein relates to an electrical power distribution system for multiple-floor buildings. More particularly, the subject matter described herein relates to methods, systems, and computer readable media for managing the distribution of power from a photovoltaic (PV) source in a multiple-floor building.

BACKGROUND

Alternative energy sources such as wind and solar power produce direct current (DC) power, which must then be integrated into existing alternating current (AC) power grids, e.g., by using inverters that convert DC to AC. Typically, homes and offices distribute AC power to power outlets throughout building. Many devices within homes and offices, most notably computers and other electronic equipment, use DC power, and thus include power adapters convert the AC power that is provided to the power outlet into the DC power required by the device. Thus, there is an increased interest in distributing DC power, rather than AC power, throughout homes, offices, or other buildings. Notably, DC power distribution has an advantage that alternative energy such as photovoltaic (PV) cells, for example, directly produce DC power and be connected to the power grid without requiring DC-to-AC inverters. In a multiple-floor DC building, each floor may have several feeders which function as a mini-DC distribution system. However, depending on the of AC-DC rectifiers, the reliability and controllability of the distribution of PV in a multi-floor building may vary.

Accordingly, there exists a need for methods, systems, and computer readable media for managing the distribution of power from a photovoltaic source in a multiple-floor building.

SUMMARY

According to one aspect, the subject matter described herein relates to, methods, systems, and computer readable media for managing the distribution of power from a photovoltaic (PV) source in a multi-floor building. In one embodiment, the method includes determining power requirements for each of a plurality of loads associated with a respective plurality of floors in a multi-floor building, wherein each of the plurality of floors includes a direct current (DC) distribution bus. The method further includes using a PV converter to supply a power output from a PV source to one or more of the plurality of loads via one or more respective DC distribution buses, wherein the power output is supplied to the one or more of the plurality of loads in an order such that each subsequent load is supplied at least a remaining portion of the power output after the power requirements of a previously supplied load is fully satisfied.

The subject matter described herein may be implemented in hardware, software, firmware, or any combination thereof. As such, the terms "function", "node", "unit", or "module" as used herein refer to hardware, which may also include software and/or firmware components, for implementing the feature described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter herein include non-transitory computer-readable media, such as disk memory devices, chip memory devices, programmable logic devices, application specific integrated circuits, and digital signal processors. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
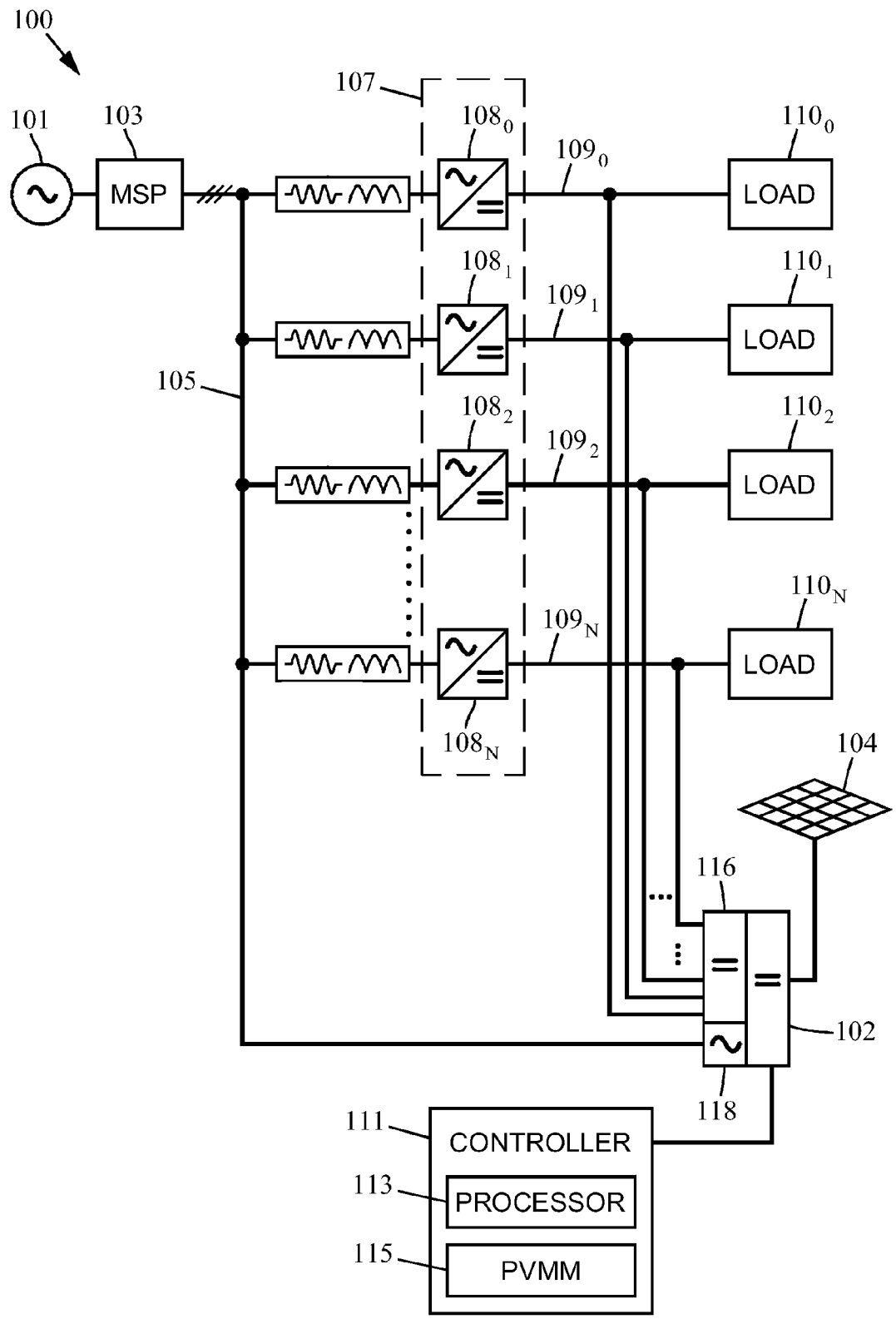
FIG. 1 is a block diagram illustrating an exemplary system for managing the distribution of power from a photovoltaic source according to an embodiment of the subject matter described herein.

In accordance with the subject matter disclosed herein, systems, methods, and computer readable media for managing the distribution of power from a photovoltaic (PV) source in a multiple-floor building are provided. Reference will now be made in detail to exemplary embodiments of the present invention, examples of which are illustrated in the accompanying drawings. Wherever possible, the same reference numbers will be used throughout the drawings to refer to the same or like parts.

The subject matter described herein relates to a novel electrical power distribution system for multiple-floor buildings. The system utilizes DC power distribution buses on each floor, thereby taking advantage of the aspects of DC power distribution. For example, the disclosed subject matter may include the connection of photovoltaic sources, such as roof-top PV source (e.g., PV array, solar panels, solar cells, etc.) and an associated PV converter to a hybrid distribution system with distributed rectifiers on each floor of a building. The subject matter further proposes the power management of each PV converter output. The system may be characterized as being extremely reliable and controllable, as well as utilizing the advantages of AC power protection devices order to avoid the high costs typically associated with high power DC protection devices. The system may also be configured to function as a low cost DC uninterruptable power supply (UPS) since a DC distribution system utilizes one less power conversion step as compared to a system that utilizes AC double-double-conversion UPS. Similarly, the system may also utilize the PV converter to increase the efficiency of a direct battery connection DC UPS.

With the proliferation of power electronics based loads in buildings, a building's electrical power supply may evolve from being based on an AC distribution network to being based on a DC distribution network. Because the power grid that supplies electrical power to the building is an AC power grid, AC to DC rectifiers are typically utilized within the building's DC distribution network. For example, in a multiple floor building (where an "N" floor building plus a basement is assumed and the $N^{th}$ floor is the top floor of the building), a rectifier may be positioned at the location of power distribution panels on each floor. In an alternate embodiment, an energy storage device, such as a battery source (not shown), may be integrated with each rectifier to provide backup power to a building floor. This kind of power distribution system may be to as an AC/DC hybrid system. In such a hybrid system, there is not a single central DC bus that connects all of the floors/loads together. Instead, local renewable sources, like PV sources, may be connected to an AC power distribution bus or to each of a plurality DC distribution buses respectively on every floor. Since PV power is intrinsically DC power, it is more efficient for the system to directly connect a PV power source to a DC bus (e.g., power from a PV panel supplied to a DC bus via a PV converter). When the power output supplied from the PV panel via a PV converter exceeds the power demands of one floor, it is advantageous to provide (e.g., feed) the remaining surplus power to the other remaining floors in the building. In order to this, the outputs (or ports) from the PV converter may be connected to the different DC buses (as shown in FIG. 1 below).

FIG. 1 is a block diagram illustrating an exemplary system for managing the distribution of power from a photovoltaic source in a multiple-floor building according to an embodiment of the subject matter described herein. In the embodiment illustrated in FIG. 1, system 100 includes a main service panel (MSP) 103 connected to an alternating current (AC) power grid 101. Main service panel 103 may be configured to provide the AC power supplied from grid 101 to an AC distribution bus 105. AC distribution bus 105 is connected to rectifiers $108_{0 \ldots N}$ which are respectively associated with building floors 0 through N (where floor 0 is the basement and floor "N" is the topmost floor of the building). In some embodiments, rectifiers $108_{0 \ldots N}$ may collectively make up a distributed rectifier 107, which may be configured to convert an AC power input into a DC power output throughout system 100.

In some embodiments, rectifiers $108_{0 \ldots N}$ are respectively connected to and provide rectified DC power to floor loads $110_{0 \ldots N}$ via DC distribution buses $109_{0 \ldots N}$. For example, rectifier $108_2$ may convert and provide DC power to second floor load $110_2$ via DC distribution bus $109_2$. Each of the rectifiers may be configured to convert AC power to DC power at the floor level. However, the power distribution from main service panel 103 to each rectifier (e.g., at a distribution panel) on each floor is still supplied as AC power.

In some embodiments, system 100 may include PV source 104, configured to capture solar radiation from the sun and to photovoltaicly produce electric power (PV power) from the captured solar radiation. In some embodiments, PV source 104 may include one or more PV or solar panels, one or more PV or solar cells, one or more PV or solar arrays, and/or any other that utilizes/contains photovoltaic material. Accordingly, PV panel 104 may be strategically positioned on the top and/or the side of a multi-floor building. The captured solar energy may then be provided from PV source 104 (as a PV output from the PV source 104) to PV converter 102, which may be configured convert the power output from PV source 104 into DC electrical power (e.g., via DC-DC step-up or step-down transformation conversion) or AC electrical power (e.g., via DC-AC conversion). In some embodiments, PV converter 102 can be configured to manage and control the power output of PV source 104. For example, PV converter 102 may be configured to extract power from PV source 104 by using maximum power point tracking (MPPT) of PV source 104. In some embodiments, PV converter 102 includes multiple outputs and may supply to every floor in a multi-floor building (i.e., including the basement), AC power 101, and/or a battery storage unit. The multiple outputs of PV converter 102 be isolated or non-isolated from each other.

In some embodiments, PV converter 102 may also include a DC component 116 that is configured to provide a power output from PV source 104 that is DC based to one or more of floor loads $110_{0 \ldots N}$ by supplying electricity via DC distribution buses $109_{0 \ldots N}$. For example, PV converter 102 may provide some amount of power output to second floor load $110_2$ via DC bus $109_2$. Similarly, PV converter 102 may include an AC component 118 that is configured to function as an inverter and convert the power output from PV source 104 (e.g., PV power) into AC power. AC component 118 may then supply the converted AC power to AC bus 105 where it may be directed to AC grid 101. System 100 may also include a controller unit 111 that is configured to manage the distribution of the power output from PV source 104 among loads $110_{0 \ldots N}$. In some embodiments, controller unit 111 may include a processor and a PV management module (PVMM) 115. In some embodiments, processor 113 may include a microprocessor, central processing unit (CPU), or any other like hardware based processor unit that is configured to execute and/or utilize management module 115 (e.g., a software based algorithm) to manage the output distribution of power as described herein as well as to track the power point (MPP) of the PV source (e.g., PV panels). Management module may be stored in memory (not shown), such as random access memory (RAM), read only memory (ROM), optical read/write memory, cache memory, magnetic read/write memory, flash memory, or any other non-transitory storage media. In one embodiment, processor 113 and memory may be used to execute and manage the operation of PV management module 115. Controller unit 111 may either be a standalone device that is communicatively connected to PV 102 (as shown in FIG. 1) or may alternatively be integrated within PV 102.

In some embodiments, PV management module 115 may be configured to determine if one or more of the building floors can be powered by the power output of PV converter 102. Management module 115 may be configured to determine distribute power to different floors of the building or AC power grid 101. In addition, PV management module 115 may be configured to monitor the power output level in order to detect a change (e.g., a rise or fall) in the power output (e.g., PV power) from PV source 104.

In some embodiments, PVMM 115 may be configured to conduct the power management of each output (e.g., output #0 to output #N) from PV converter 102. For example, PV converter output N may be instructed by controller unit 111 to supply full power to a load on floor N (e.g., the top floor of the building) because the floor is closest in proximity to the PV converter 102. Such a configuration is advantageous since loads positioned closer to PV converter 102 are less likely to exhibit energy loss (e.g., cable losses). In some embodiments, the full power supplied is equal to the lower of i) the maximum output power rating of PV converter 102 or ii) the extracted MPP rating of PV source 104.

If the power output from PV converter 102 is sufficient to supply full power to an entire multi-floor building, the outputs #0 through #N (or #1 through #N if no basement in building) of PV converter 102 are controlled to supply full power to the loads on each floor and basement of the building. In addition, the AC output of PV converter 102 may be uncontrolled to feed surplus power from PV converter 102 back to AC power grid 101.

If it is determined that the power output is not sufficient to supply full power to the entire building, PVMM 115 may be able to determine that PV converter 102 is able to supply full power up to M floors (e.g., floor N through floor (N−M+1)) and possibly partial power to floor N−M, where M≤N. In such a scenario, outputs N to (N−M+1) of PV converter 102 may be controlled to supply full power to floor N through floor (N−M+1), based on a specific floor's proximity to PV converter 102. However, output (N−M) of PV converter 102 may be uncontrolled to supply power to floor (N−M) to balance the power of the multiple output ports of PV converter 102. Notably, while the outputs N to (N−M+1) of PV converter 102 are well controlled to supply full power, output (N−M) may be uncontrolled because output (N−M) is used to adjust the total power output of PV converter 102 to be equal to the total power input of PV converter 102 (e.g., assuming no loss is exhibited by PV converter 102). In the scenario where the output (N−M) is also well controlled, then the possibility exists that the power input and power output of output (N−M) are not equal to each other.

In some embodiments, PVMM 115 may be configured to detect and the management of power distribution if the power output from PV converter drops due to insufficient solar energy (e.g. a sunny day evolving to a cloudy For example, suppose PVMM 115 may initially be configured to supply full to M floors before the power drops. However, after the power output from PV source 104 drops, PV converter 102 may only supply full power to K floors, K is an integer number and K<M<N. In some embodiments, PV converter 102 automatically shuts down the outputs which supply power to floors located away from PV converter 102, such as floor (N−M) through floor (N−K−1). Conversely, PV converter 102 may be configured to automatically supply full power to floors which are close to PV converter 102, such as floor #N through floor (N−K+1). Similarly, output (N−K) of PV converter 102 is uncontrolled to balanced power.

In some embodiments, PV converter 102 may be configured to store at least a portion of the power (i.e., power output from PV source 104) in energy storage devices (e.g., a battery storage device) during light load scenarios, such as during the weekend in an office building. Alternatively, PV converter 102 may be configured to send at least a portion of the power output to grid 101 via output port "AC".

In some embodiments, the design of the PV system for a particular multi-multi-floor building, the number of outputs for PV converter 102 may be predetermined based on the power requirements of the different building floors as well as the maximum power available from the PV source. By identifying the maximum number of floors that may be serviced by PV converter 102, construction costs may be saved. For example, it is likely that only the top of a high-rise building will be able to be powered by power output supplied from PV panels if the PV panels are installed on the rooftop since the power output is generated will most likely not be sufficient to supply the entire high-rise building. Accordingly, a PV system design including only an identifiable maximum number of floors can save considerable costs (e.g., converter costs and cable costs).

Figure 2:
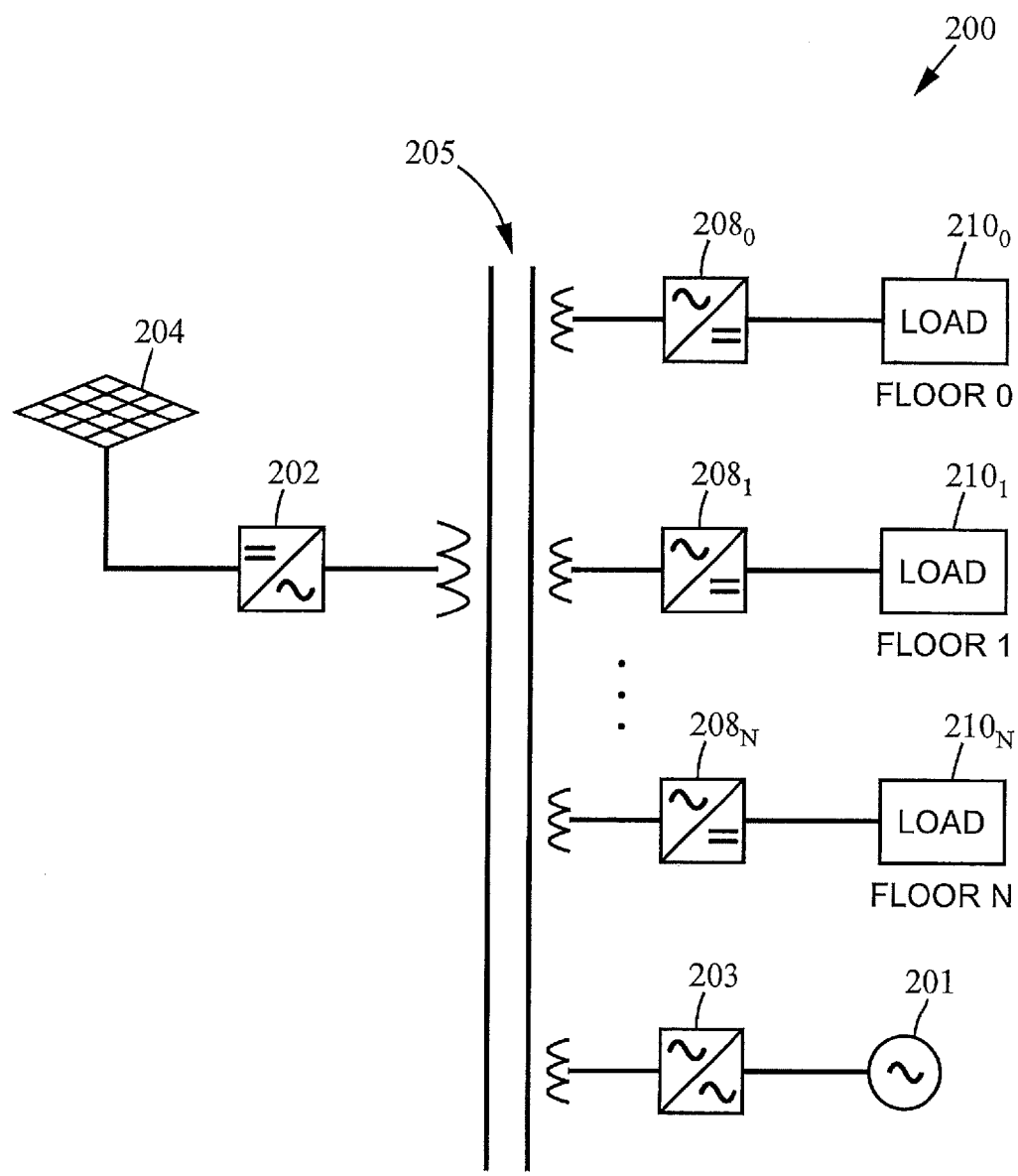
FIG. 2 is a block diagram illustrating an exemplary isolated voltaic power converter topology for managing the distribution of power from a photovoltaic source according to an embodiment of the subject matter herein.

FIG. 2 is a block diagram illustrating an exemplary isolated PV power converter topology for managing the distribution of power from a photovoltaic source in a multi-floor building according to an embodiment of the subject matter described herein. Notably, FIG. 2 illustrates one of many possible isolated topologies of a PV converter 202. In system 200, PV converter 202 can receive converted solar energy (e.g., PV power) from PV source 204 and outputs AC power to a high frequency transformer 205. AC power may then be distributed to a plurality of AC-DC rectifiers 208 located on a respective plurality of building floors. Each of the AC-DC rectifiers 208 may then convert the supplied AC power into DC power that is provided to a floor load 210. FIG. 2 also illustrates that transformer 205 may provide AC power (e.g., surplus power from PV converter 202 to AC power grid 201 via an AC-AC rectifier 203.

Figure 3:
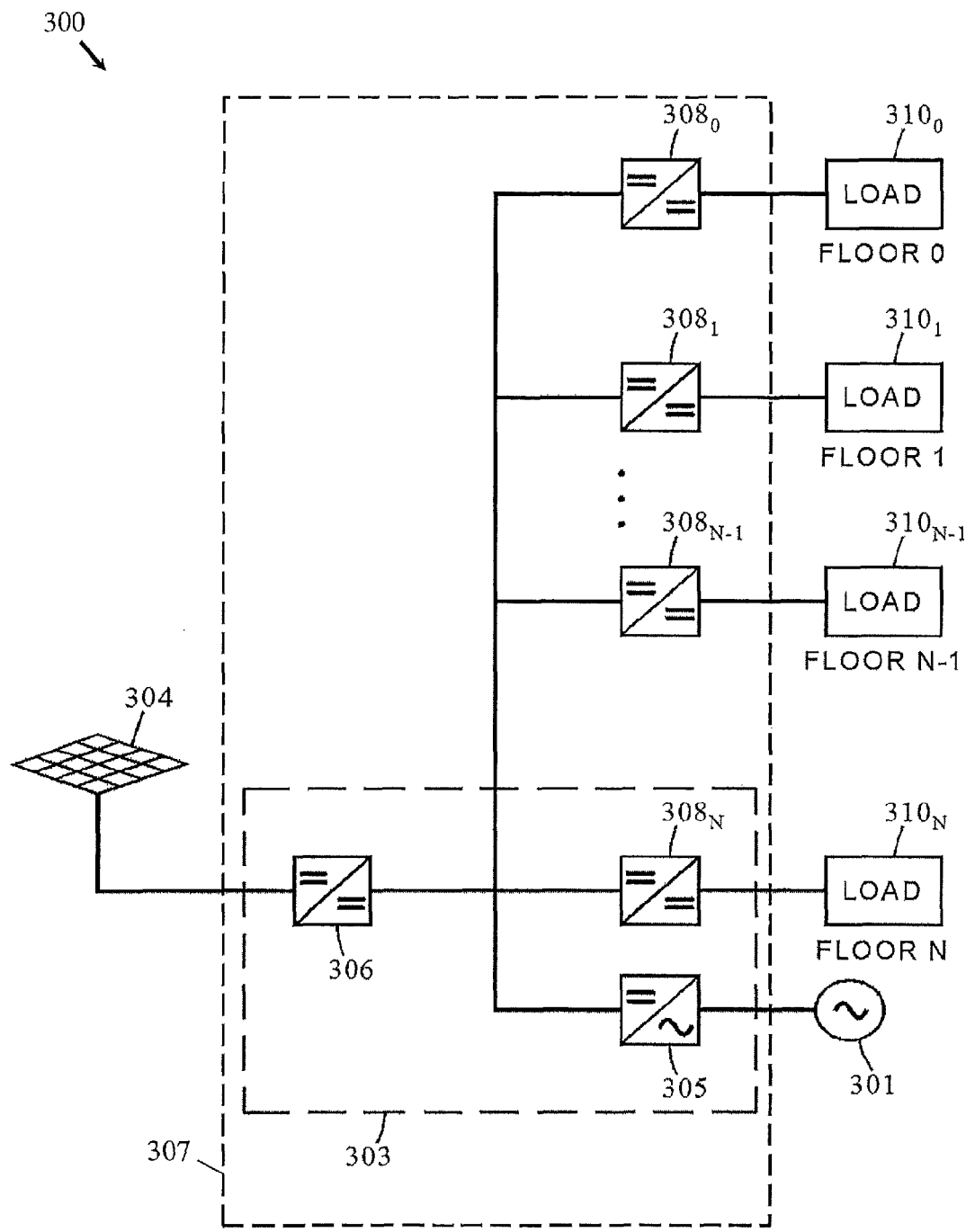
FIG. 3 is a block diagram illustrating an exemplary modular photovoltaic voltaic power converter topology for managing the distribution of power from a photovoltaic source according to an embodiment of the subject matter described herein.

As an additional alternate embodiment to system 100 illustrated in FIG. 1, a PV converter may include a modular converter, which enables a PV converter to initially supply a predefined number of floors but can subsequently be expanded to accommodate the load demands of additional floors if One example of such modular system 300 is illustrated in FIG. 3. Notably, FIG. 3 depicts a baseline modular PV converter 303 that comprises DC-DC converter 306, a DC-AC converter 305, and a DC-DC converter $308_N$. In some embodiments, modular PV converter 303 may represent the smallest version of the modular converter in system 300. Converter (N−1) through converter 0 may be subsequently added as modules to baseline converter 303 in order to base line converter 303, which may be used to accommodate the distribution of PV power in a multiple-floor building. As an example, FIG. 3 further depicts a modular PV converter 307 that represents the full modular converter comprising baseline modular PV converter 303 and DC-DC converters $308_0 \ldots _{N-1}$. Specifically, each of modular DC-DC converters 308 may be configured to provide power to loads 310 on floors 0 through N. FIG. 3 also illustrates that AC power (e.g., surplus power from baseline DC-AC converter 305) may be supplied to AC power grid 301.

Figure 4A:
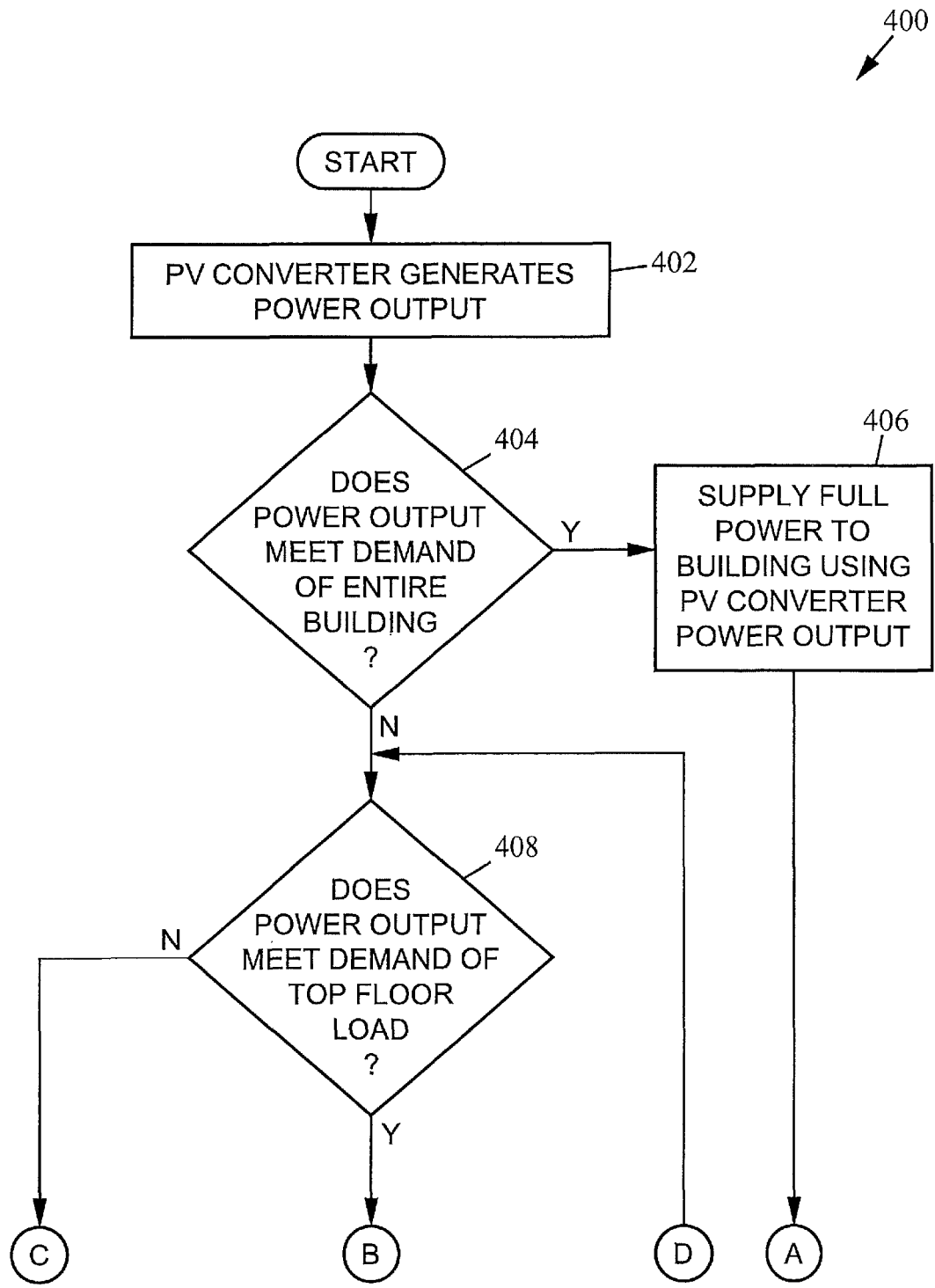
FIGS. 4A and 4B are flow charts illustrating exemplary processes for managing the distribution of power from a photovoltaic source according to an embodiment of the subject matter described herein.
Figure 4B:
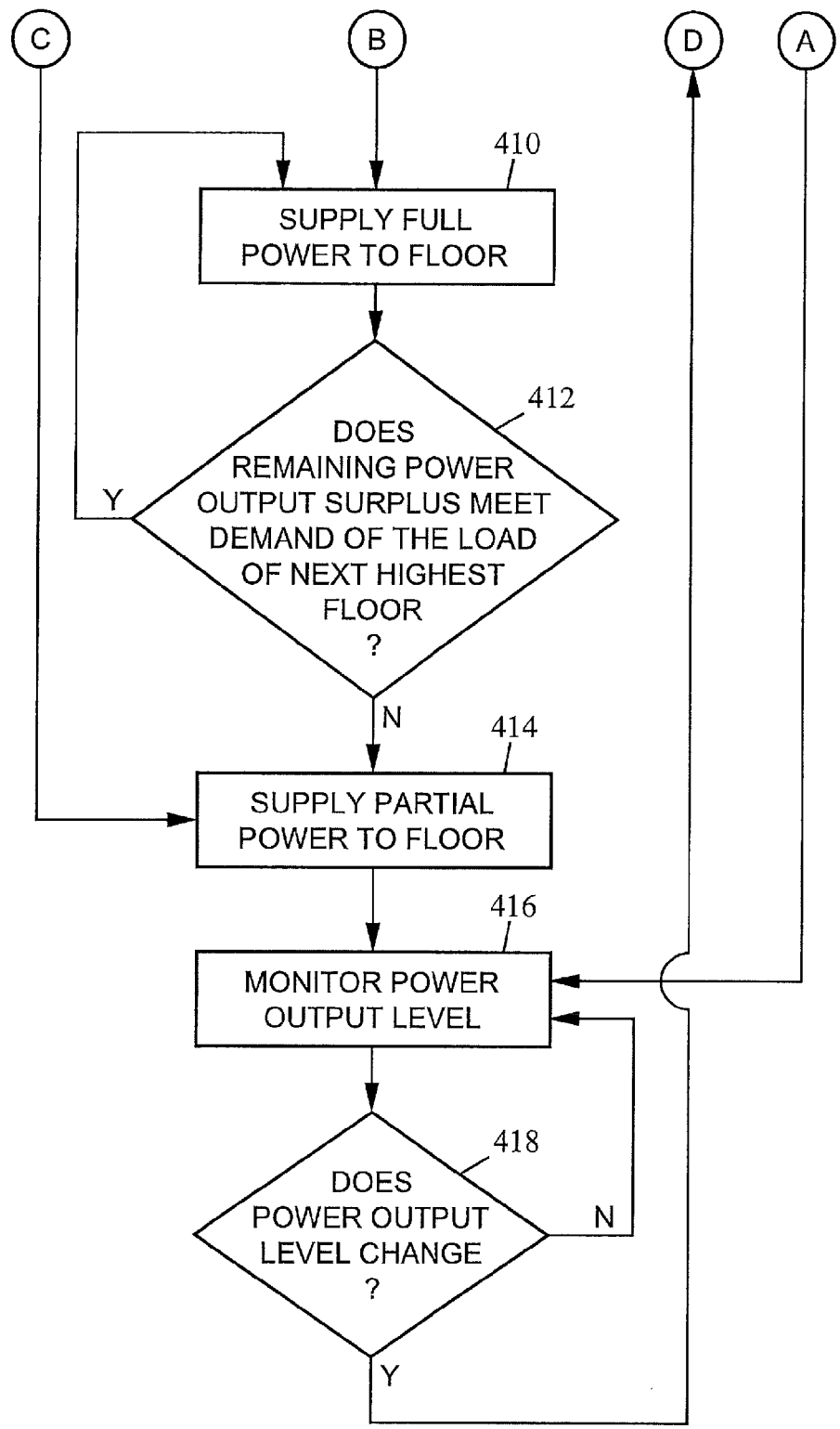

FIGS. 4A and 4B are flow charts illustrating exemplary processes for managing the distribution of power from a photovoltaic source in a multiple-floor building according to an embodiment of the subject matter described herein. In step 402, a PV converter generates a power output (i.e., converts power output from a PV source). In some embodiments, a PV converter receives converted solar radiation energy captured by PV panels installed on the top of a building. The PV converter then uses the received PV power to generate (e.g., convert) a power output for distribution among the various floor loads in the building.

In step 404, a determination is made as to whether the power output meets the needs of the entire building. In some embodiments, a controller unit configured to determine if the power supplied by the PV converter is able to the power demand of all N floors in the building (wherein floor 0 is the basement of the building and floor N is the top floor of the building). If the power output is sufficient to satisfy the requirements of the loads on floors 0 through N, then method 400 continues to step 406 where the full power is supplied to all N of the building and the remaining power is back sent back to the AC grid. Otherwise, method 400 proceeds to step 408.

In step 408, a determination is made as to whether the power output meets the needs of the load on the top floor N. If the power output is sufficient to satisfy the requirements of the load on floors N, then method 400 continues to step 410. Otherwise, method 400 proceeds to step 414.

In step 410, the full power output required to meet the demands of the load on floor N is supplied. In some embodiments, the PV converter supplies the required power output to the floor load by providing the necessary power to a DC bus connected to the load on floor N. Although the load is illustrated as a single block, the load in FIG. 1 may comprise a plurality of different devices (e.g., a lamp, a computer, and other devices plugged into outlets on floor N) on floor N that require power without departing from the scope of the present subject matter.

In step 412, a determination is made as to whether a remaining power output surplus meets the needs of the load of the next highest floor (e.g., floor N−1). In one embodiment, the controller unit determines that the remaining output is sufficient to meet the demands of the load on floor N−1 and method loops back to step 410 wherein the full power output required to meet the demands of the load on floor N−1 is supplied. If it is determined the remaining power output surplus does not meet the needs of the load of the next highest (e.g., floor N−1), then method 400 continues to step 414.

In step 414, a partial power output is supplied to the load on the floor. In some embodiments, if the power output is not enough to supply full power to a floor, then the PV converter provides an amount of power that is uncontrolled to supply power to the floor in order to balance the power of the PV converter.

In step 416, the PV power output level is monitored. In some embodiments, the controller unit may be configured to monitor generated power output level and/or the solar radiation energy received from the PV panels.

In block 418, a determination is made as to whether the power output level changes. In some embodiments, if the controller unit detects a change in the monitored PV power output level and/or the received converted solar radiation energy (see step 416), then method 400 loops back to block 408 where the controller reassesses whether power output meets the needs of the floor loads (i.e., starting with the top floor).

It will be understood that various details of the subject matter described herein may be changed without departing from the scope of the subject matter described herein. Furthermore, the foregoing description is for the purpose of illustration only, and not for the purpose of limitation.

What is claimed is:

1. A method for managing the distribution of photovoltaic (PV) power in a multi-floor building, the method comprising:

determining power requirements for each of a plurality of loads associated with a respective plurality of floors in a multi-floor building, wherein each of the plurality of floors includes a direct current (DC) distribution bus;

determining whether a PV source located at the multi-floor building is able to supply a power output that meets the power requirements of all of the plurality of loads;

using a PV converter to supply the power output entirely from the PV source to the plurality of loads in the event the power output meets or exceeds the power requirements of all of the plurality of loads;

in the event the PV source is determined as being unable to supply the power output that meets the power requirements of all of the plurality of loads in the multi-floor building, using the PV converter to supply the power output from the PV source to one or more of the plurality of loads via one or more respective DC distribution buses, wherein the power output is supplied to the one or more of the plurality of loads in an order such that each subsequent load is supplied a portion of the power output after the power requirement of a previously supplied load is fully satisfied, wherein the PV converter is configured to provide the power output to each of the DC distribution buses via a direct connection on each of the plurality of floors; and wherein the plurality of floors is equal to N floors, and the topmost floor of the multi-floor building is the $N^{th}$ floor, wherein the power output is first supplied to a load associated with the $N^{th}$ floor, and wherein the power output is distributed to fully supply the loads associated with the $N^{th}$ floor and M floors below the $N^{th}$ floor, M being an integer equal to a number of floors with loads capable of being fully supplied by the power output, and a remainder of the power output is used to partially supply a load associated with a floor M+1 floors below the $N^{th}$ floor.

2. The method of claim 1 wherein loads associated with floors 0 through (N−M−1) in the multi-floor building are supplied with DC power that is converted from alternating current (AC) power originating from an AC power grid.

3. The method of claim 1 wherein the power output from the PV source is converted to at least one of direct current (DC) power and alternating current (AC) power by the PV converter located at the multi-floor building.

4. The method of claim 3 wherein the power output from the PV source converted by the PV converter is utilized as an uninterruptible power supply (UPS) for the multi-floor building.

5. The method of claim 1 wherein the one or more DC distribution buses are respectively connected to one or more power outputs of the PV converter.

6. The method of claim 1 wherein the remaining portion of the power output is fed to a battery storage unit if the power requirements of each of the plurality of loads is satisfied.

7. The method of claim 1 wherein the remaining portion of the power output is fed to an alternating current (AC) power grid if the power requirements of each of the plurality of loads is satisfied.

8. A system for managing the distribution of photovoltaic (PV) power in a multi-floor building, the system comprising:

a plurality of direct current (DC) distribution buses for distributing a power output from a PV source to a plurality of loads associated with a respective plurality of floors in a multi-floor building;

a PV controller unit configured to determine power requirements for each of the plurality of loads and to determine whether a PV source located at the multi-floor building is able to supply a power output that meets the power requirements of all of the plurality of loads;

a PV converter configured to supply the power output entirely from the PV source to the plurality of loads in the event the power output meets or exceeds the power requirements of all of the plurality of loads and to supply the power output from the PV source to one or more of the plurality of loads via one or more of the plurality of DC distribution buses in the event the PV source is determined as being unable to supply the power output that meets the power requirements of all of the plurality of loads in the multi-floor building, wherein the power output is supplied to the one or more of the plurality of loads in an order such that each subsequent load is supplied at least a remaining portion of the power output after the power requirements of previously supplied loads are fully satisfied, wherein the PV converter is configured to provide the power output to each of the DC distribution buses via a direct connection on each of the plurality of floors; and wherein the plurality of floors is equal to N floors, and the topmost floor of the multi-floor building is the $N^{th}$ floor, wherein the power output is first supplied to a load associated with the $N^{th}$ floor, and wherein the power output is distributed to fully supply the loads associated with the $N^{th}$ floor and M floors below the $N^{th}$ floor, M being an integer equal to a number of floors with loads capable of being fully supplied by the power output, and a remainder of the power output is used to partially supply a load associated with a floor M+1 floors below the $N^{th}$ floor.

9. The system of claim 8 wherein loads associated with floors 0 through (N−M−1) in the multi-floor building are supplied with DC power that is converted from alternating current (AC) power originating from an AC power grid.

10. The system of claim 8 wherein the PV converter is further configured to convert the power output from the PV source to at least one of direct current (DC) power and alternating current (AC) power and is located at the multi-floor building.

11. The system of claim 10 wherein the power output from the PV source converted by the PV converter is utilized as an uninterruptible power supply (UPS) for the multi-floor building.

12. The system of claim 8 wherein the one or more DC distribution buses are respectively connected to one or more power outputs of the PV converter.

13. The system of claim 8 wherein the remaining portion of the power output is fed to a battery storage unit if the power requirements of each of the plurality of loads is satisfied.

14. The system of claim 8 wherein the remaining portion of the power output is fed to an alternating current (AC) power grid if the power requirements of each of the plurality of loads is satisfied.

15. A non-transitory computer readable medium having stored thereon executable instructions for controlling a computer to perform steps comprising:

determining power requirements for each of a plurality of loads associated with a respective plurality of floors in a multi-floor building, wherein each of the plurality of floors includes a direct current (DC) distribution bus;

determining whether a PV source located at the multi-floor building is able to supply a power output that meets the power requirements of all of the plurality of loads;

using a PV converter to supply the power output entirely from the PV source to the plurality of loads in the event the power output meets or exceeds the power requirements of all of the plurality of loads;

in the event the PV source is determined as being unable to supply the power output that meets the power requirements of all of the plurality of loads in the multi-floor building, using the PV converter to supply the power output from the PV source to one or more of the plurality of loads via one or more respective DC distribution buses, wherein the power output is supplied to the one or more of the plurality of loads in an order such that each subsequent load is supplied at least a remaining portion of the power output after the power requirements of a previously supplied load is fully satisfied, wherein the PV converter is configured to provide the power output to each of the DC distribution buses via a direct connection on each of the plurality of floors; and wherein the plurality of floors is equal to N floors, and the topmost floor of the multi-floor building is the $N^{th}$ floor, wherein the power output is first supplied to a load associated with the $N^{th}$ floor, and wherein the power output is distributed to fully supply the loads associated with the $N^{th}$ floor and M floors below the $N^{th}$ floor, M being an integer equal to a number of floors with loads capable of being fully supplied by the power output, and a remainder of the power output is used to partially supply a load associated with a floor M+1 floors below the $N^{th}$ floor.

* * * * *